US009718210B1

(12) United States Patent
Sazhin

(10) Patent No.: US 9,718,210 B1
(45) Date of Patent: Aug. 1, 2017

(54) METHOD OF FABRICATING A WOODEN PERCH

(71) Applicant: Parrot Wizard Inc, Brooklyn, NY (US)

(72) Inventor: Michael Sazhin, Brooklyn, NY (US)

(73) Assignee: Parrot Wizard Inc, Brooklyn, NY (US)

( * ) Notice: Subject to any disclaimer, the term of this patent is extended or adjusted under 35 U.S.C. 154(b) by 765 days.

(21) Appl. No.: 14/246,346

(22) Filed: Apr. 7, 2014

Related U.S. Application Data

(60) Provisional application No. 61/809,545, filed on Apr. 8, 2013.

(51) Int. Cl.
B27M 1/00 (2006.01)

(52) U.S. Cl.
CPC .................................. B27M 1/003 (2013.01)

(58) Field of Classification Search
CPC ........ B27M 1/0003; B27M 1/00; B27M 3/08; B24B 5/04; B24B 5/18; B24B 5/34; B24B 5/38; B24B 1/00; B27C 5/00; B27C 7/00; B27C 7/06
USPC ............. 451/28, 49, 303; 144/358, 371, 372
See application file for complete search history.

(56) References Cited

U.S. PATENT DOCUMENTS

| | | | | | |
|---|---|---|---|---|---|
| 441,286 | A | * | 11/1890 | Cotton | B27C 7/00 142/1 |
| 1,802,164 | A | * | 4/1931 | Williams | B27C 7/00 142/56 |
| 2,210,737 | A | * | 8/1940 | Trebert | B27C 5/00 142/26 |
| 2,543,405 | A | * | 2/1951 | Hayes | B27C 5/00 144/133.1 |
| 2,678,069 | A | * | 5/1954 | Gingras | B27C 7/00 142/50 |
| 3,125,461 | A | * | 3/1964 | Hoffman | B24B 21/12 118/106 |
| 3,214,870 | A | * | 11/1965 | Elmendorf | B27M 1/003 144/329 |
| 3,216,875 | A | * | 11/1965 | Wenthe | B27M 3/08 156/154 |
| 3,277,933 | A | * | 10/1966 | Lalli | B27C 7/06 142/38 |

(Continued)

FOREIGN PATENT DOCUMENTS

DE         3420644 A1 * 12/1985 ............ B27M 1/003

*Primary Examiner* — George Nguyen
(74) *Attorney, Agent, or Firm* — Neustel Law Offices

(57) ABSTRACT

A method of fabricating a wooden perch which is affordable, has a reduced chance of infection or infestation, and provides increased comfort for animals. The method of fabricating a wooden perch generally includes the steps of providing a piece of wood and using a wood crafting assembly to create natural, randomized contours along the exterior of the piece of wood to complete the wooden perch. The piece of wood is rotated along its length across a wood crafting assembly in two opposite directions to create an interwoven sine-wave pattern along its length. Random parts of the wood are then applied to the wood crafting assembly at random angles with random pressure levels to create a natural contour along the length of the perch. Mounting hardware may be included to aid in securing the perch to various surfaces, such as an indoor bird cage or an outdoor bird feeder.

20 Claims, 14 Drawing Sheets

(56) References Cited

U.S. PATENT DOCUMENTS

| | | | | |
|---|---|---|---|---|
| 3,277,937 A * | 10/1966 | Miles | B27M 1/003 144/115 |
| 3,621,615 A * | 11/1971 | Ottinger | B24B 7/28 144/136.1 |
| 3,732,648 A * | 5/1973 | Schaller | B24B 5/30 451/242 |
| 3,768,527 A * | 10/1973 | Messick | B23Q 35/102 142/38 |
| 3,791,430 A * | 2/1974 | Hood | B27B 5/12 144/133.1 |
| 3,909,986 A * | 10/1975 | Miyazawa | B24B 21/02 451/300 |
| 4,230,163 A * | 10/1980 | Barton | B27C 5/00 144/116 |
| 4,839,994 A * | 6/1989 | Heesemann | B24B 49/10 356/606 |
| 5,863,239 A * | 1/1999 | Barton, II | B24B 5/42 451/242 |
| 6,220,940 B1 * | 4/2001 | Johnson | B24B 5/18 451/168 |
| 6,254,455 B1 * | 7/2001 | Irvine | B24B 41/066 451/28 |
| 6,332,431 B1 * | 12/2001 | Brown | A01K 13/00 119/468 |
| 6,619,236 B1 * | 9/2003 | Johnakin, III | A01K 31/12 119/468 |
| 7,111,583 B2 * | 9/2006 | Willinger | A01K 15/025 119/467 |
| 8,721,396 B1 * | 5/2014 | Martin | B24B 7/28 451/28 |
| 2005/0081795 A1 * | 4/2005 | Witter | A01K 31/12 119/468 |
| 2005/0255799 A1 * | 11/2005 | Heeseman | B24B 7/02 451/303 |
| 2013/0130594 A1 * | 5/2013 | Shirk | B27C 1/12 451/28 |
| 2014/0364038 A1 * | 12/2014 | Lancaster-Larocque | B24B 37/02 451/5 |

* cited by examiner

METHOD OF FABRICATING A WOODEN PERCH

CROSS REFERENCE TO RELATED APPLICATIONS

I hereby claim benefit under Title 35, United States Code, Section 119(e) of U.S. provisional patent application Ser. No. 61/809,545 filed Apr. 8, 2013. The 61/809,545 application is hereby incorporated by reference into this application.

STATEMENT REGARDING FEDERALLY SPONSORED RESEARCH OR DEVELOPMENT

Not applicable to this application.

BACKGROUND OF THE INVENTION

Field of the Invention

The present invention relates generally to a wooden perch for birds and more specifically it relates to a method of fabricating a wooden perch which is affordable, has a reduced chance of infection or infestation, and provides increased comfort for animals.

Description of the Related Art

Any discussion of the related art throughout the specification should in no way be considered as an admission that such related art is widely known or forms part of common general knowledge in the field.

Perches are often provided for various animals, including pets (such as within a cage) or outdoor wildlife (such as in connection with a birdfeeder). Perches are also often included in zoos for the animals being displayed. Prior art perches include synthetic materials such as plastic or are merely comprised of natural branches from trees. Perches which are taken directly from a tree may carry the risk of infection to the animal using it. Additionally, such natural perches may also be infested with various pests, such as termites.

Synthetic perches may include contours which are not natural and are too uniform for various types of animals. This may lead to muscular problems for birds or other animals. Birds which perch upon excessively smooth or uniform perches have been observed to be at increased risk of "bumble foot"; a medical condition in birds which causes sores on the feet. Additionally, smooth or uniform perches may increase the risk that a clumsy animal could slide off or fall and injure itself.

Because of the inherent problems with the related art, there is a need for a new and improved method of fabricating a wooden perch which is affordable, has a reduced chance of infection or infestation, and provides increased comfort for animals.

BRIEF SUMMARY OF THE INVENTION

The invention generally relates to a machined wood perch fabrication method which includes the steps of providing an elongated piece of wood and using a wood crafting assembly to create natural, randomized contours along the exterior of the piece of wood to complete the wooden perch. The piece of wood is rotated along its length across a wood crafting assembly in two opposite directions to create an interwoven sine-wave pattern along its length. Random parts of the wood are then applied to the wood crafting assembly at random angles with random pressure levels to create a natural contour along the length of the perch. Mounting hardware may be included to aid in securing the perch to various surfaces, such as an indoor bird cage or an outdoor bird feeder.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
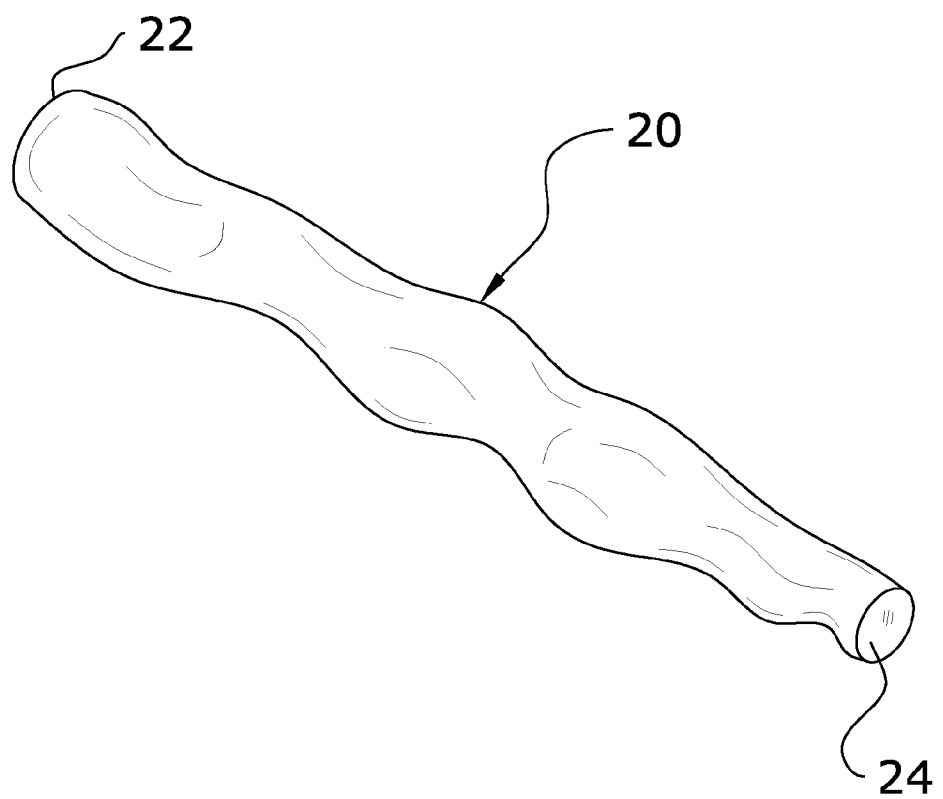
FIG. 1 is a first side perspective view of the present invention.
Figure 2:
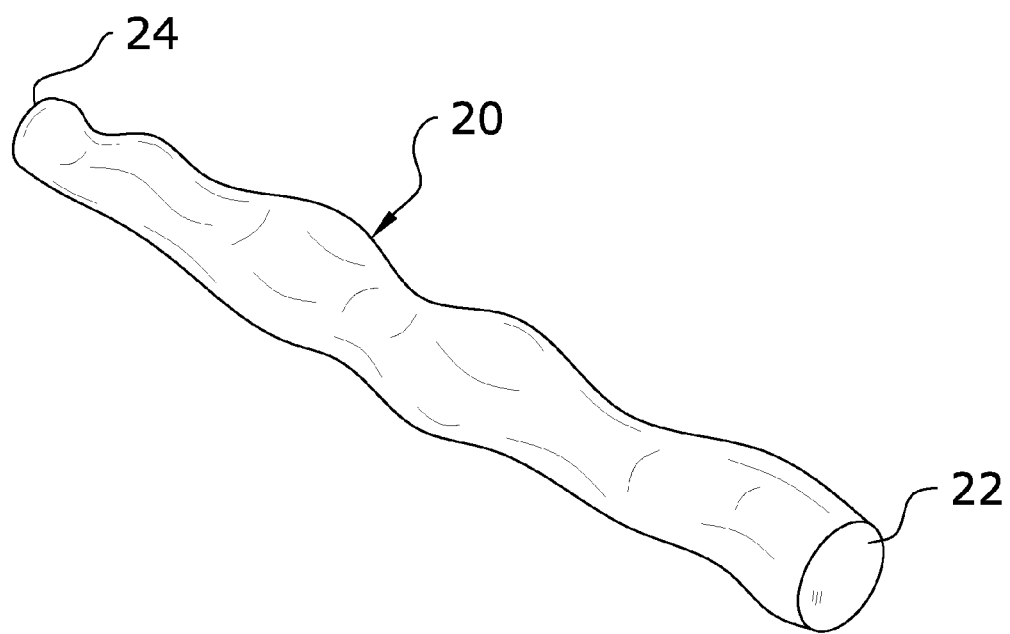
FIG. 2 is a second side perspective view of the present invention.
Figure 3:
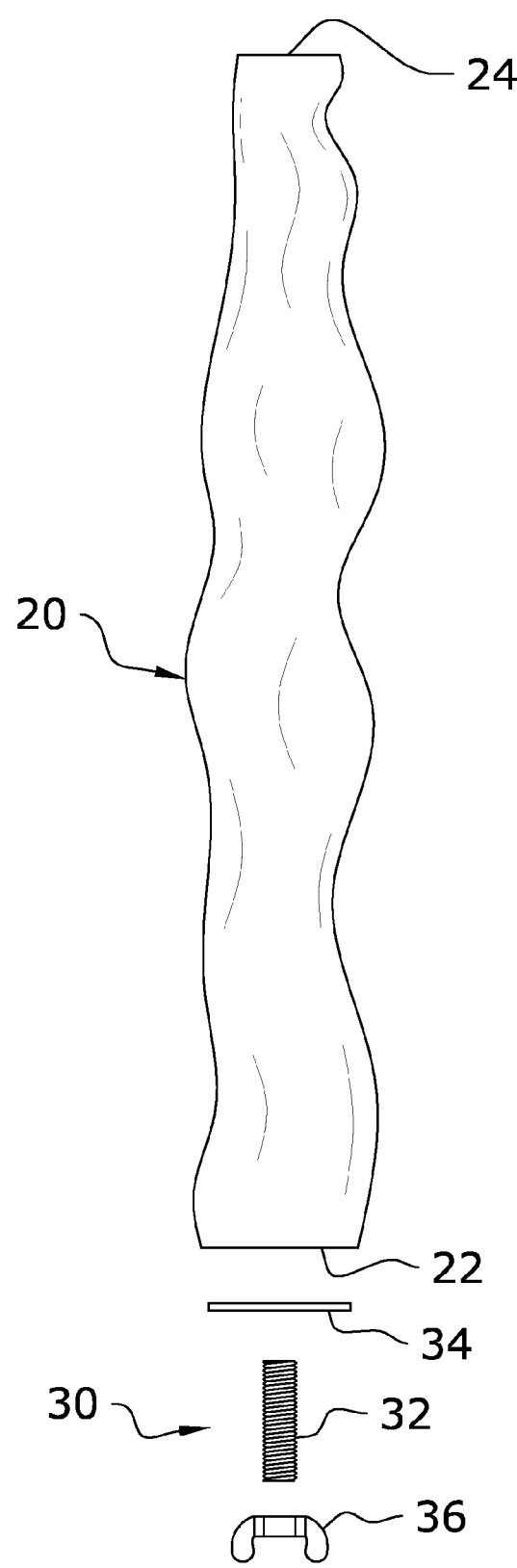
FIG. 3 is a top view of the present invention.
Figure 4:
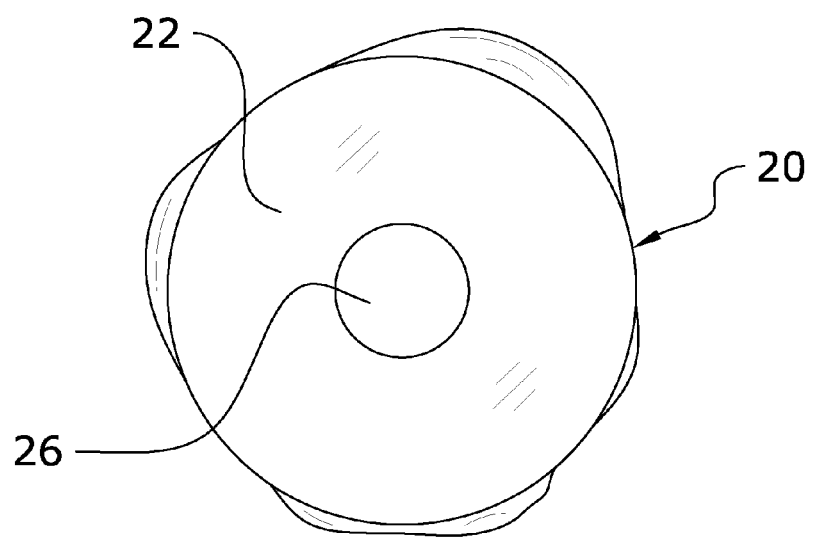
FIG. 4 is a first end view of the present invention.
Figure 5:
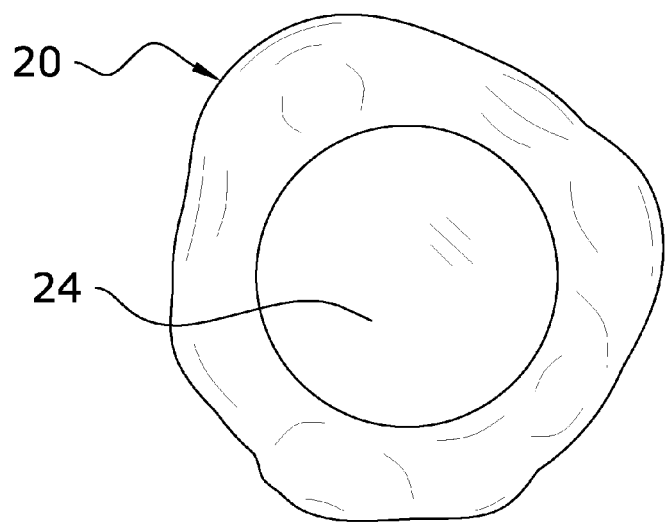
FIG. 5 is a second end view of the present invention.

A. Overview.

Turning now descriptively to the drawings, in which similar reference characters denote similar elements throughout the several views, FIGS. 1 through 13 illustrate a method of fabricating a wooden perch 10, which comprises the steps of providing a piece of wood 19 and using a wood crafting assembly 40 to create natural, randomized contours along the exterior of the piece of wood 19 to complete the wooden perch 20. The piece of wood 19 is rotated along its length across a wood crafting assembly 40 in two opposite directions to create an interwoven sine-wave pattern along its length. Random parts of the wood are then applied to the wood crafting assembly 40 at random angles with random pressure levels to create a natural contour along the length of the perch 20. Mounting hardware 30 may be included to aid in securing the perch 20 to various surfaces 12, such as an indoor bird cage or an outdoor bird feeder.

B. Perch.

The present invention comprises a natural, wooden perch 20 on which various animals 14 such as pets or wildlife may position themselves. The perch 20 may be comprised of various shapes, sizes, and configurations to suit different functionality. For example, the length and width of the perch 20 will vary in embodiments meant for different types of animals 14.

The perch 20 includes a first end 22 and a second end 24. As shown in the figures, the external contours of the perch 20 will vary randomly due to the fabrication methods discussed herein. The perch 20 may be comprised of various materials, but will preferably be comprised of wood. Various types of wood may be utilized so long as the weight of the animal 14 may be supported thereby. By way of example, wood-types may include Douglas fir, pine, and maple.

The external contours of the perch 20 will preferably be randomized to reflect what would commonly be found in nature. The width of the perch 20 may also taper from the first end 22 to the second end 24 to simulate a natural branch. These and other features of the present invention will aid in comforting the animal 14 by not having a synthetic feel when the animals 14 is resting on the perch.

Figure 6:
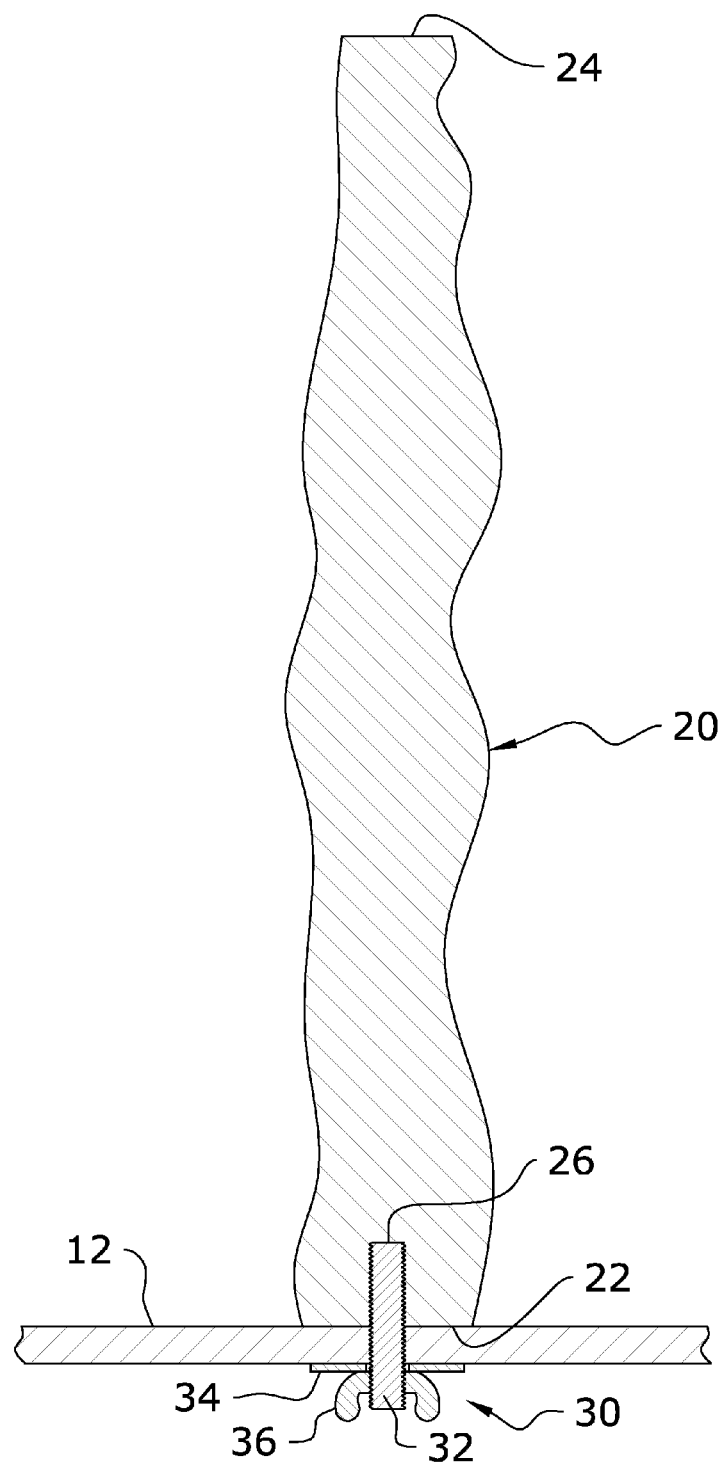
FIG. 6 is a side sectional view of the present invention secured to a surface.

As best shown in FIG. 6, the perch 20 may include mounting hardware 30 to aid in mounting the perch 20 to various surfaces 12. The perch 20 may be adapted for use either indoors or outdoors with a wide range of animals 14. The perch 20 is equally as suited for use indoors with a pet as it is suited for use outdoors with wildlife.

The mounting hardware 30 may vary in different embodiments to allow mounting on various surfaces 12. By way of example, the perch 20 could be secured to a bird cage, a wall, a bird stand, a bird feeder, posts, and other surfaces 12. Thus, the mounting hardware 30 may comprise various connectors such as bolts and the like. In some embodiments, the mounting hardware 30 may comprise an adhesive such as glue.

In the embodiment shown in the figures, the mounting hardware 30 comprises a hanger bolt 32 which is secured within a receiver opening 26 formed in the first end 22 of the perch 20. A washer 34 and wing nut 36 may be utilized in combination with the hanger bolt 32 to secure the perch 20 to various surfaces 12.

In some embodiments, the receiver opening 26 may be positioned at locations other than the ends 22, 24 of the perch 20, such as anywhere along the length of its body. For example, the receiver opening 26 and mounting hardware 30 may be located on the outer surface of the perch adjacent to its first end 22.

Figure 8:
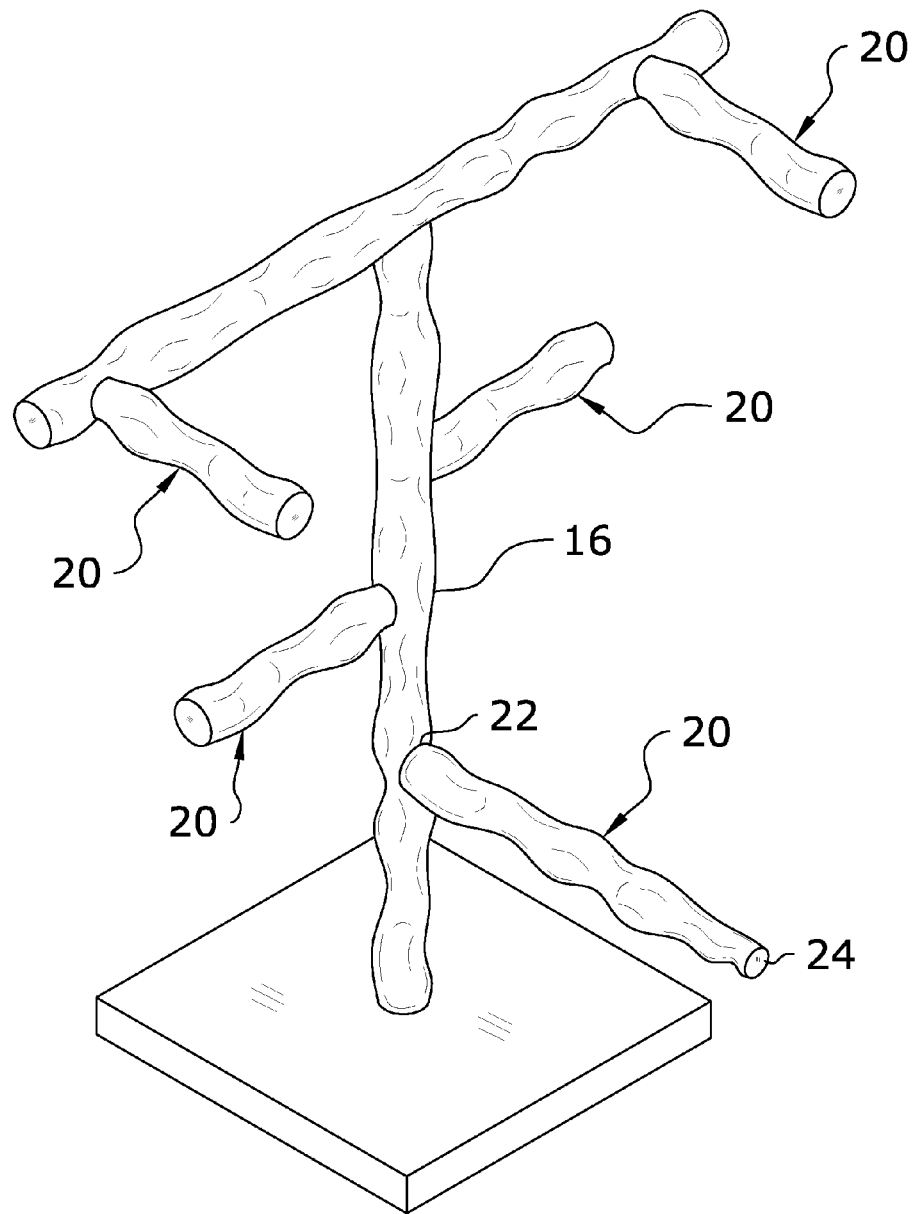
FIG. 8 is an upper perspective view of a plurality of perches secured to a vertical post to form a tree configuration.

It should be appreciated that a plurality of perches 40 may be combined to form various structures, such as a tree configuration as shown in FIG. 8. In such a configuration, a plurality of perches 40 are each secured to extend from a vertical post 16 to form a tree configuration on which a bird or other animal may rest.

C. Method of Fabrication of Preferred Embodiment.

FIGS. 9-13 illustrate a preferred embodiment of the method of fabricating the perch 20 of the present invention. It should be appreciated that aspects of the fabrication process may vary from the exemplary embodiment discussed herein. It should also be understood that various steps may be performed by a human, by a machine, or by a combination thereof.

To begin fabrication of the perch 20, a piece of wood 19 is first provided and cut to any number of initial, elongated shapes. While the figures illustrate substantially the piece of wood 19 with cylindrical shape and a circular cross-section, the piece of wood 19 could comprise various other cross-sections, such as square, rectangular, octagonal and the like. The width, length, and overall dimensions of the piece of lumber may vary in different embodiments depending on the desired size, shape, and configuration of the completed perch 20.

As shown in FIG. 8, the piece of wood 19 is then applied to a wood crafting assembly 40 to create a first contour pattern along its outer circumference. The wood crafting assembly 40 may comprise various devices, tools, mechanisms, surfaces or the like which are adapted to aid in the crafting of wooden materials. By way of example, the wood crafting assembly 40 could comprise various types of sanders as shown in the figures, or could comprise a simple abrasive surface.

The piece of wood 19 is generally applied to the wood crafting assembly 40 at an angle and rotated as its length is drawn across the wood crafting assembly 40 in a first direction. The angle may vary, but will preferably be within the range of 30 degrees to 60 degrees, such as 45 degrees. The speed of rotation and speed that the piece of wood 19 is drawn across the wood crafting assembly 40 may vary in different embodiments.

This step may be performed manually, such as by a human being, or may be performed automatically by a machine or other automated process. When a first pass is completed, the first contour pattern will extend around the piece of wood 19 from its first end 22 to its second end 24. The contour pattern will generally resemble a first sine wave pattern of dips and rises along the exterior of the piece of wood 19.

Figure 9A:
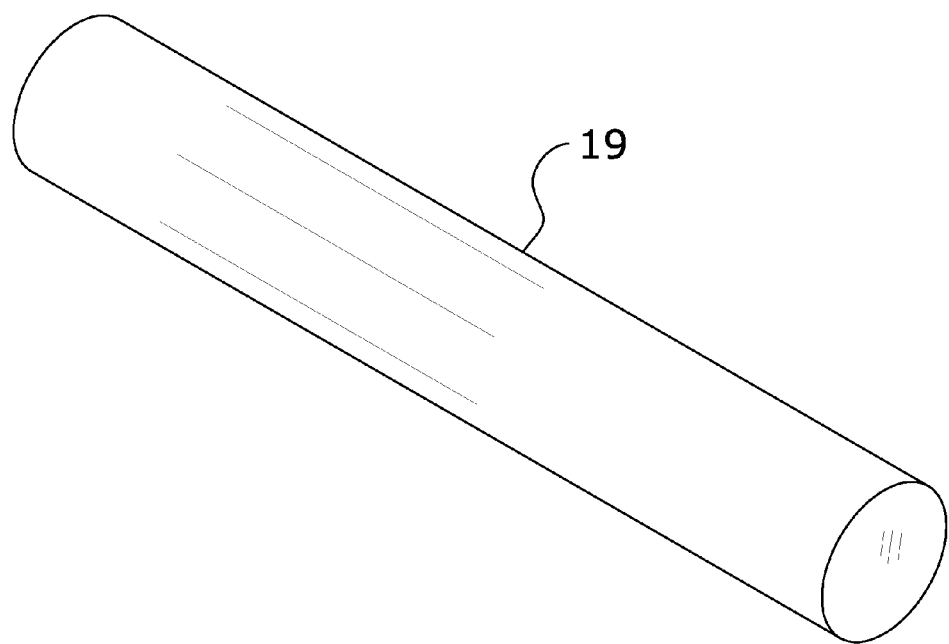
FIG. 9a is an upper perspective view of an exemplary piece of wood prior to being fabricated into a perch.
Figure 9B:
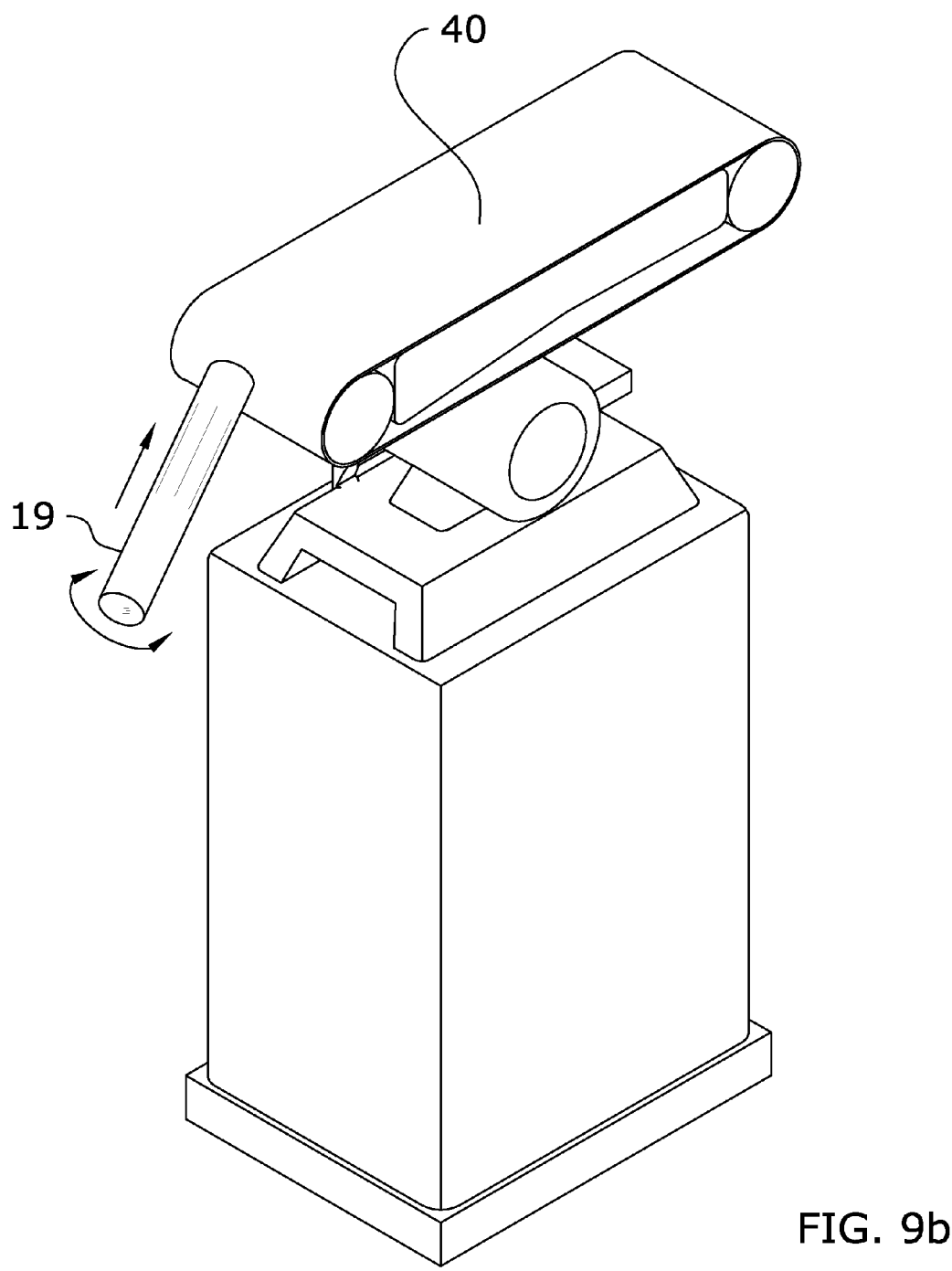
FIG. 9b is an upper perspective view illustrating application of a piece of wood to a wood crafting assembly in a first direction.
Figure 9C:
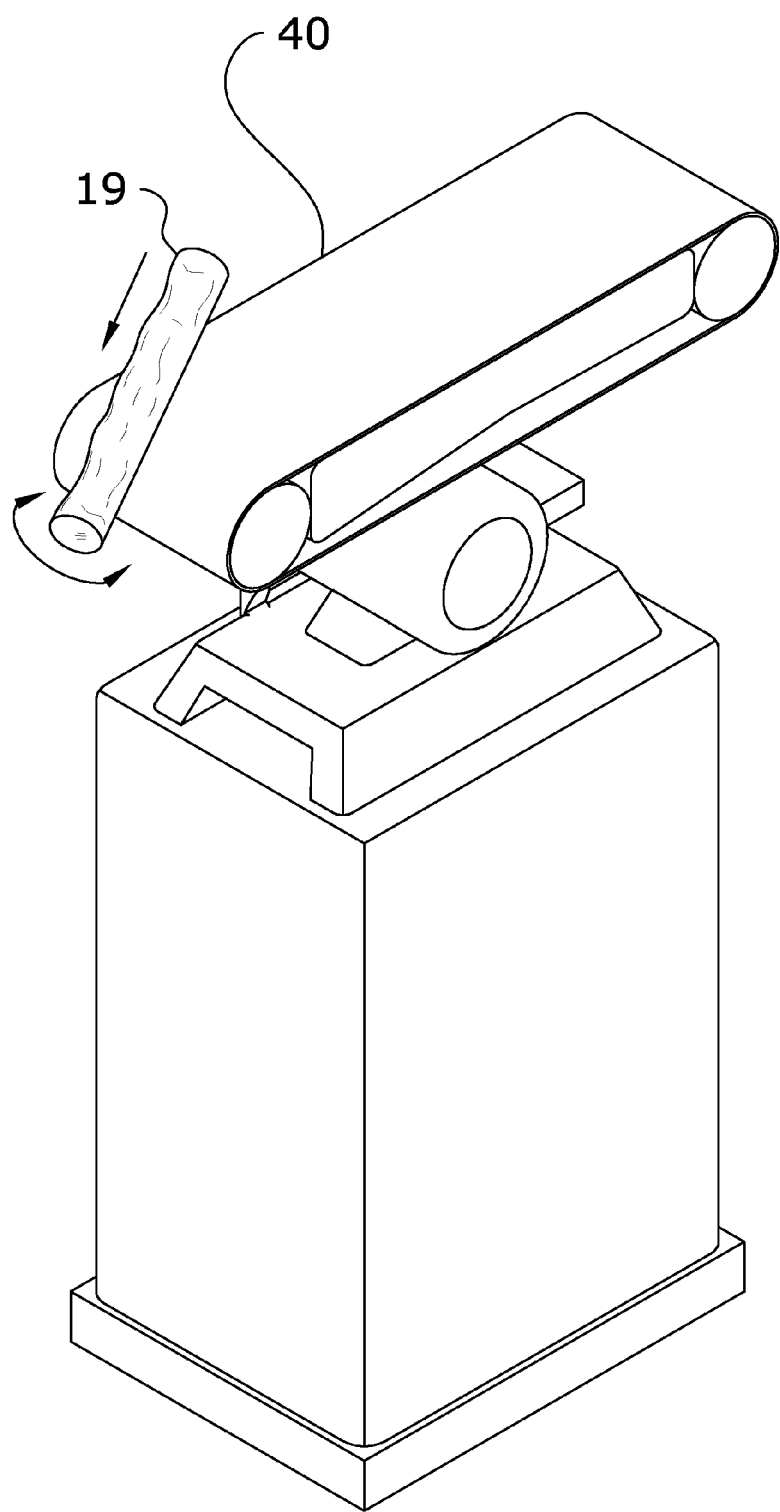
FIG. 9c is an upper perspective view illustrating application of a piece of wood to a wood crafting assembly in a second direction.

As shown in FIG. 9, the patterned piece of wood 19 is then applied to the wood crafting assembly 40 in a second direction to create a second contour pattern which interlaces with the first contour pattern. Using the methods described herein, the second contour pattern will generally resemble a second sine wave pattern. The second pass may be accomplished by various methods, such as rotating the piece of wood 19 before making the pass.

The rotated piece of wood 19 is applied to the wood crafting assembly 40 at an angle and rotated as its length is drawn across the wood crafting assembly 40 in a second direction which is opposite with respect to the first direction. The angle may vary, but will preferably be comprised of approximately 45 degrees. The angles of the first and second passes may be the same or, in some embodiments, may be different.

These steps may also be performed manually or automatically by a machine or other automated process. When this second pass is completed, a first contoured pattern will extend from the first end 22 to the second end 24 and a second contoured pattern will interweave with the first contoured pattern from the second end 24 to the first end 22. The interwoven contour patterns will create bumpy edges along the length of the piece of wood 19. In some embodiments, the piece of wood 19 may be wobbled or otherwise randomly moved around during the first or second passes to create even more randomized contours along the completed perch 20.

Figure 10:
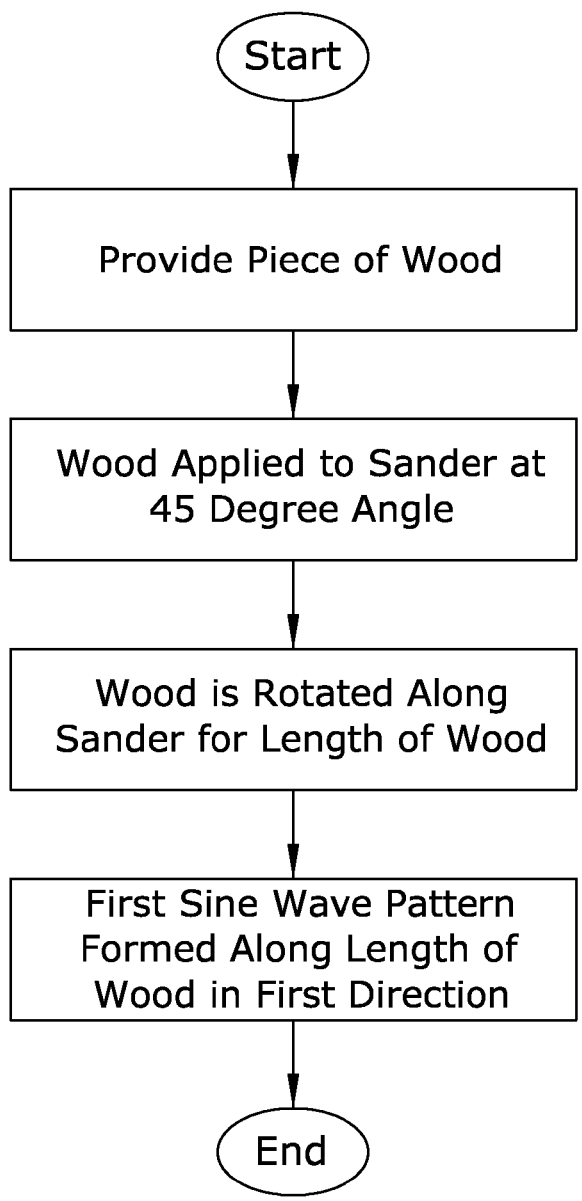
FIG. 10 is a flowchart illustrating steps for forming a first sine wave contour while fabricating the present invention.

With the interweaving contoured patterns created in the piece of wood 19, the ends 22, 24 are rounded off and randomized contours are added as shown in FIG. 10. The piece of wood 19 is tapped on the wood crafting assembly 40 at randomized points along its length. The angle of contact between the piece of wood 19 and the wood crafting assembly 40 is also randomized for each tap. The pressure applied to the piece of wood 19 as it is tapped on the wood crafting assembly 40 is also randomized. This will add natural, randomized contours to the piece of wood 19 which will more accurately reflect nature in the contours of the finished perch 20.

Due to the nature of this step, it will preferably be performed manually by an individual. While an automated process, such as using a machine, may be utilized, it will likely not exhibit the randomness in application of pressure, angle, and sanding locations that would be achieved manually by a human being.

Figure 7:
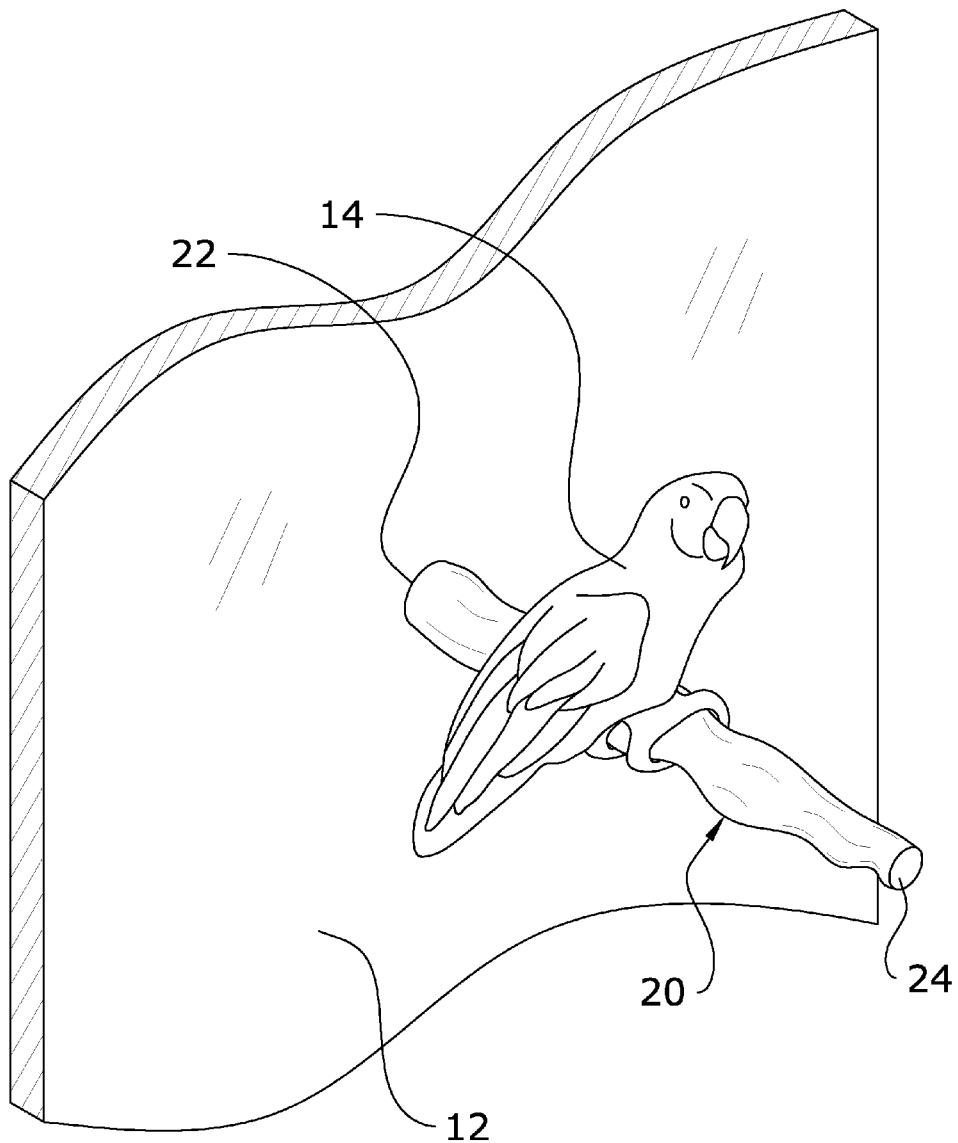
FIG. 7 is an upper perspective view of the present invention in use.
Figure 11:
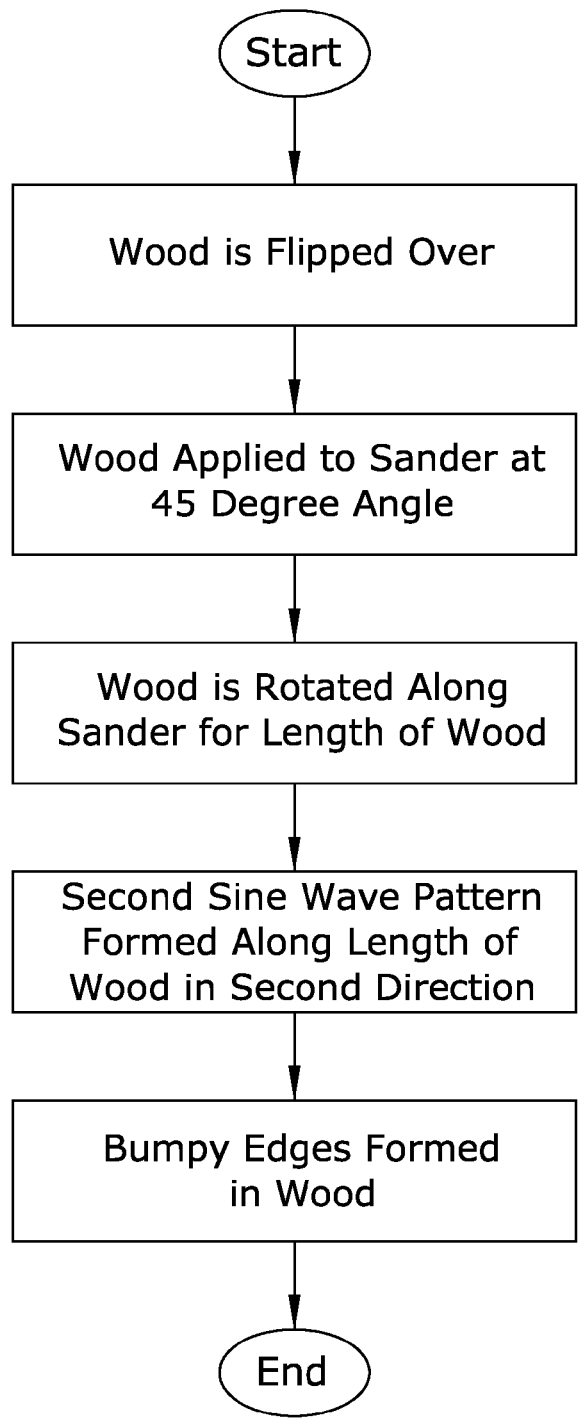
FIG. 11 is a flowchart illustrating steps for forming a second sine wave contour while fabricating the present invention.
Figure 12:
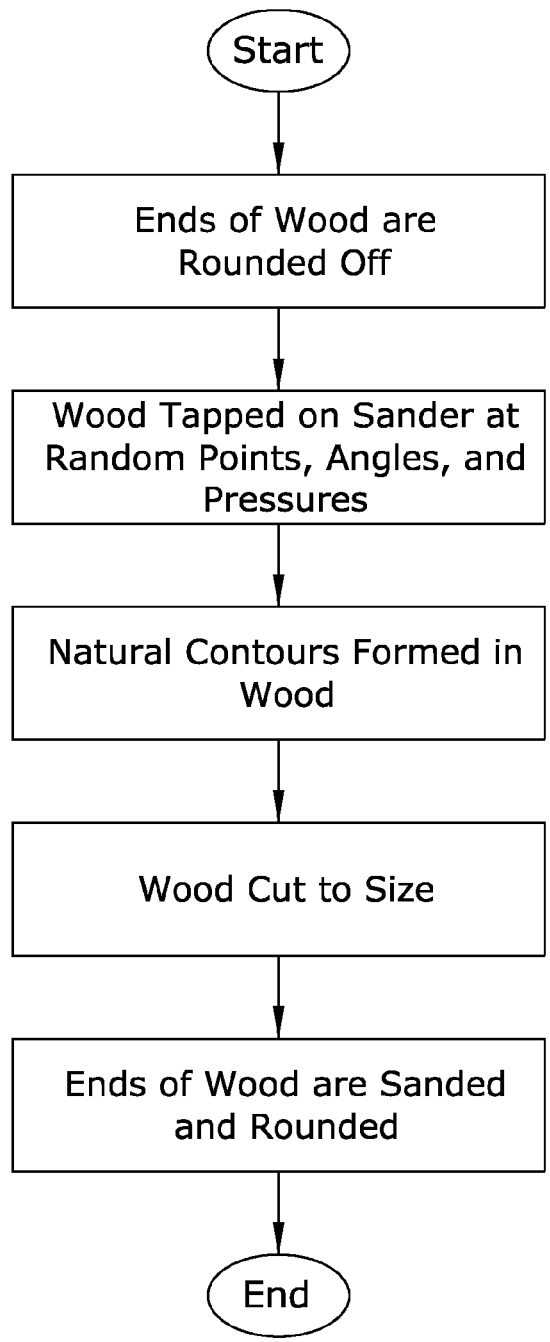
FIG. 12 is a flowchart illustrating steps for finalizing preparation of the wood perch of the present invention.
Figure 13:
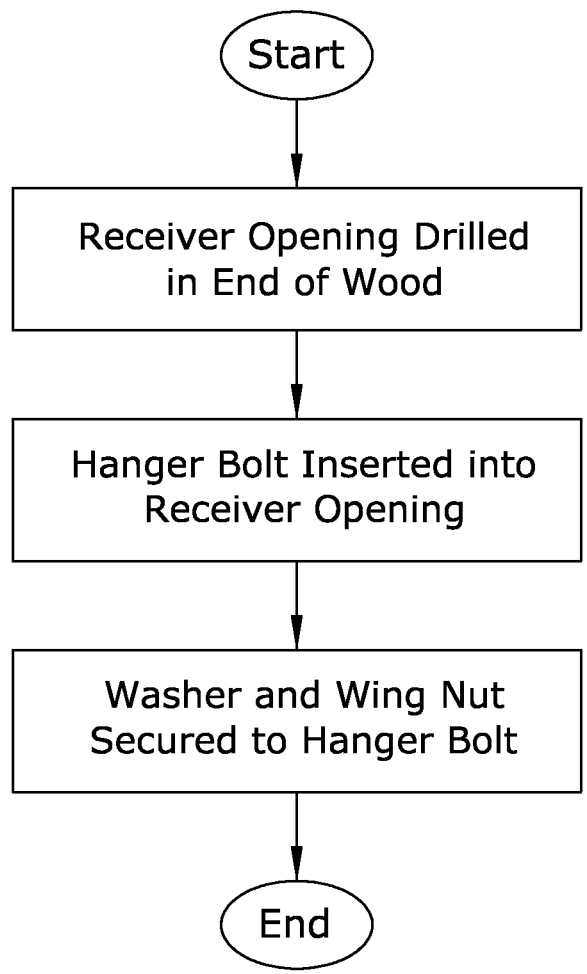
FIG. 13 is a flowchart illustrating installation of mounting hardware on the completed wood perch of the present invention.

After completion of the exterior contours, the piece of wood 19 is cut to size. The ends 22, 24 of the wood are sanded and rounded. As shown in FIG. 11, the mounting hardware 30 may then be applied. In a preferred embodiment, a receiver opening 26 is drilled into the first end 22 of the perch 20. A hanger bolt 32 is then inserted into the receiver opening 26. A washer 34 and wing nut 36 may then be utilized to secure the finished perch 14 to a surface 12 to be used by an animal 14 such as shown in FIG. 7.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A method of fabricating a wooden perch, comprising:
   providing a piece of wood having a first end and a second end;
   applying a first contoured pattern to said piece of wood by rotating said piece of wood as said piece of wood is passed over a wood crafting assembly in a first direction;
   applying a second contoured pattern to said piece of wood by rotating said piece of wood as said piece of wood is passed over said wood crafting assembly in a second direction; and
   applying a randomized contour to said piece of wood by applying pressure to random points along said piece of wood by said wood crafting assembly.

2. The method of fabricating a wooden perch of claim 1, wherein said piece of wood is passed over said wood crafting assembly in said first direction at a first angle.

3. The method of fabricating a wooden perch of claim 2, wherein said piece of wood is passed over said wood crafting assembly in said second direction at said first angle.

4. The method of fabricating a wooden perch of claim 3, wherein said first angle is between 30 degrees and 60 degrees.

5. The method of fabricating a wooden perch of claim 4, wherein said first angle is comprised of 45 degrees.

6. The method of fabricating a wooden perch of claim 1, wherein said steps of applying said first contoured pattern and applying said second contoured pattern are each performed automatically by a machine.

7. The method of fabricating a wooden perch of claim 6, wherein said step of applying a randomized contour is performed manually.

8. The method of fabricating a wooden perch of claim 1, wherein said step of applying a randomized contour further comprises applying random levels of pressure between said piece of wood and said wood crafting assembly.

9. The method of fabricating a wooden perch of claim 8, wherein said step of applying a randomized contour further comprises utilizing random angles of contact between said piece of wood and said wood crafting assembly.

10. The method of fabricating a wooden perch of claim 1, further comprising the step of installing mounting hardware to said piece of wood.

11. The method of fabricating a wooden perch of claim 1, wherein said first contoured pattern is interwoven with said second contoured pattern.

12. The method of fabricating a wooden perch of claim 11, wherein said first contoured pattern is comprised of a first sine wave pattern.

13. The method of fabricating a wooden perch of claim 12, wherein said second contoured pattern is comprised of a second sine wave pattern.

14. The method of fabricating a wooden perch of claim 1, further comprising the step of wobbling said piece of wood while applying said first contoured pattern.

15. The method of fabricating a wooden perch of claim 14, further comprising the step of wobbling said piece of wood while applying said second contoured pattern.

16. The method of fabricating a wooden perch of claim 1, further comprising the step of rotating said piece of wood 180 degrees after applying said first contoured pattern.

17. The method of fabricating a wooden perch of claim 1, further comprising the step of tapering said piece of wood between said first end and said second end.

18. A method of fabricating a wooden perch, comprising:
   providing a piece of wood having a first end and a second end;
   applying a first contoured pattern to said piece of wood by rotating said piece of wood as said piece of wood is passed over a wood crafting assembly in a first direction at a first angle;
   rotating said piece of wood 180 degrees;
   applying a second contoured pattern to said piece of wood by rotating said piece of wood as said piece of wood is passed over said wood crafting assembly at said first angle, wherein said first contoured pattern is interwoven with said second contoured pattern;

applying a randomized contour to said piece of wood by applying pressure to random points along said piece of wood at random pressures and random angles by said wood crafting assembly;

taping a width of said piece of wood between said first end and said second end; and installing mounting hardware to said piece of wood.

19. The method of fabricating a wooden perch of claim 18, wherein said first angle is comprised of 45 degrees.

20. The method of fabricating a wooden perch of claim 18, wherein said piece of wood is comprised of a material selected from a group consisting of Douglas fir, pine, and maple.

\* \* \* \* \*